(12) United States Patent
Song et al.

(10) Patent No.: US 11,552,678 B2
(45) Date of Patent: Jan. 10, 2023

(54) ANTENNA SELECTION METHOD AND TERMINAL

(71) Applicant: Huawei Technologies Co., Ltd., Shenzhen (CN)

(72) Inventors: Jie Song, Wuhan (CN); Yuan-Hao Lan, Shanghai (CN); Yuanpeng Li, Shenzhen (CN); Xinli Zhang, Shenzhen (CN); Tongbo Wang, Shanghai (CN); Ji Ding, Shanghai (CN); Bin Luo, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 17/416,302

(22) PCT Filed: Dec. 20, 2018

(86) PCT No.: PCT/CN2018/122330
§ 371 (c)(1),
(2) Date: Jun. 18, 2021

(87) PCT Pub. No.: WO2020/124480
PCT Pub. Date: Jun. 25, 2020

(65) Prior Publication Data
US 2022/0077897 A1    Mar. 10, 2022

(51) Int. Cl.
*H04B 7/04* (2017.01)
*H04B 7/0404* (2017.01)
(Continued)

(52) U.S. Cl.
CPC ......... *H04B 7/0404* (2013.01); *H04B 7/0608* (2013.01); *H04B 7/0814* (2013.01); *H04B 7/0413* (2013.01); *H04W 84/12* (2013.01)

(58) Field of Classification Search
CPC .. H04B 7/0404; H04B 7/0608; H04B 7/0814; H04B 7/0413; H04B 7/0825; H04W 84/12
See application file for complete search history.

(56) References Cited

U.S. PATENT DOCUMENTS 10,312,973 B1 *   6/2019  Luo ........................ H01Q 1/243
2009/0196371 A1 *  8/2009  Yamamoto ........... H04B 7/0808
                                                        375/267
(Continued)

FOREIGN PATENT DOCUMENTS

CN    103262632 A    8/2013
CN    104836028 A    8/2015
(Continued)

*Primary Examiner* — Hashim S Bhatti
(74) *Attorney, Agent, or Firm* — Conley Rose, P.C.

(57) ABSTRACT

An antenna selection method and a terminal, where the terminal includes m primary antennas configured for a first application program and n secondary antennas, where m≥1, and n≥1. The method includes, when the terminal is in a WI-FI connected state and a landscape state, obtaining a key factor and a radio frequency indicator that are of each of m+n antenna combinations, determining a first antenna combination based on the key factor and the radio frequency indicator, where the first antenna combination is a first-priority antenna combination of the m+n antenna combinations, and the first antenna combination includes at least one of the secondary antennas, and using the first antenna combination to perform communication for a second application program.

20 Claims, 10 Drawing Sheets

(51) Int. Cl.
    *H04B 7/06*    (2006.01)
    *H04B 7/08*    (2006.01)
    H04B 7/0413    (2017.01)
    H04W 84/12     (2009.01)

(56)            References Cited

U.S. PATENT DOCUMENTS

2013/0083722 A1    4/2013    Bhargava et al.
2015/0123859 A1*   5/2015    Kodama ................ H01Q 1/52
                                                        343/702
2019/0229400 A1*   7/2019    Luo ..................... H04B 7/0825
2019/0393918 A1*   12/2019   Han ......................... G06T 7/55
2020/0099138 A1*   3/2020    Garrido Lopez .... H01Q 9/0407
2021/0126992 A1*   4/2021    Jung .................. H04M 1/0245

FOREIGN PATENT DOCUMENTS

CN        106229683 A       12/2016
CN        106374969 A        2/2017
CN        106453963 A        2/2017
CN        107483075 A       12/2017
CN        107483092 A       12/2017
CN        206835387 U        1/2018
CN        107682037 A        2/2018
CN        107682057 A        2/2018
CN        107707281 A        2/2018
CN        107947825 A        4/2018
CN        108494444 A        9/2018
EP          1860404 A1      11/2007
WO       2017071206 A1       5/2017

* cited by examiner

ANTENNA SELECTION METHOD AND TERMINAL

CROSS-REFERENCE TO RELATED APPLICATIONS

This application is a U.S. National Stage of International Patent Application No. PCT/CN2018/122330 filed on Dec. 20, 2018, which is hereby incorporated by reference in its entirety.

TECHNICAL FIELD

This application relates to the communications field, and in particular, to an antenna selection method and a terminal.

BACKGROUND

With development of mobile devices, more APP applications (for example, game applications and video applications) require a user to hold and operate the terminals in a landscape mode. An antenna for receiving a Wi-Fi signal is usually designed to be in a corner or bezel of the terminal. As shown in FIG. 1, two antennas of a terminal are disposed in positions of an antenna 0 and an antenna 1. Therefore, when the mobile phone is in the landscape state, hands of a user hold the antennas, consequently affecting signal reception of the antennas and causing "death grip" when the mobile phone is in a Wi-Fi connected state. This deteriorates Wi-Fi performance and severely reduces user experience.

Currently, to resolve a problem that Wi-Fi performance deteriorates when the mobile phone is in the landscape state, an antenna switching method is disclosed in some technologies. According to the method, signal quality of a Wi-Fi signal received by a Wi-Fi antenna is first detected, for example, a signal strength, a transmission speed, or a packet loss rate; and when the signal quality is less than a threshold, another antenna with better signal quality is switched to, to resolve a problem that an original antenna is blocked.

According to the existing antenna switching method, only the secondary diversity antenna is used to replace the original blocked primary antenna, and impact on an original antenna system resulting from the switching is not considered. Therefore, communication effect of an antenna system may be still poor after the switching is performed. For example, in a multiple-input multiple-output (multiple-input multiple-output, MIMO) technical scenario, for example, for a 4-transmitter 4-receiver (4T4R for short) terminal device, because one antenna is blocked, it is necessary to switch to a new antenna combination and use the new antenna combination for communication. However, this is not an optimal solution to achieving a MIMO effect, further may affect Wi-Fi performance, and make it difficult to improve user experience.

SUMMARY

To resolve the foregoing problem that Wi-Fi performance and user experience are still poor after a terminal device in a landscape state switches to a new antenna combination, this application provides the following technical solutions.

According to a first aspect, this application provides an antenna selection method. The method may be applied to a terminal, and the terminal includes m primary antennas configured for a first application program and n secondary antennas, where m≥1, n≥1, and the first application program includes a program and a service, for example, a calling service, that run when the terminal is in a portrait state. The n secondary antennas may be configured to perform communication for a second application program, or perform communication for the second application program after being combined with at least one of the m primary antennas. Further, the second application program includes a program and a service, for example, a game service, that run when the terminal is in a landscape state.

The method includes: when the terminal is in a Wi-Fi connected state and a landscape state, obtaining a key factor and a radio frequency indicator that are of each of m+n antenna combinations; determining a first antenna combination based on the key factor and the radio frequency indicator, where the first antenna combination is a first-priority antenna combination in the m+n antenna combinations, and the first antenna combination includes at least one of the secondary antennas; and using the first antenna combination to perform communication for the second application program.

The key factor includes one or more of an application delay, a received signal strength indicator RSSI, a signal-to-noise ratio SNR, and a packet loss rate. The radio frequency indicator includes one or more of antenna receiver sensitivity, a transmit power, error vector magnitude, a radiation pattern, and an extreme Wi-Fi throughput. In addition, another key factor and another radio frequency indicator may be alternatively included. This is not limited in this application.

According to the method provided in this aspect, when the terminal is in the Wi-Fi connected state and the landscape state, the terminal combines the newly added secondary antennas with the original primary antennas of the terminal to form new antenna combinations, and determines the first-priority first antenna combination based on the measured key factor and the measured radio frequency indicator that are of each antenna combination. Because the first antenna combination includes at least one of the secondary antennas, use of the secondary antenna for communication of the second application program resolves a "death grip" problem caused when a user holds the terminal in a landscape mode. In addition, in this method, the first antenna combination selected based on the key factor and the radio frequency indicator has optimal Wi-Fi performance in a MIMO technical scenario, thereby ensuring antenna communication quality after switching is performed and improving user experience.

With reference to the first aspect, in a possible implementation of the first aspect, the determining a first antenna combination based on the key factor and the radio frequency indicator includes: The terminal calculates a key factor score of each antenna combination based on the key factor, determines a radio frequency reference score of each antenna combination based on the radio frequency indicator, calculates a total score of each antenna combination, where the total score is a sum of the radio frequency reference score and the key factor score, and selects an antenna combination with a highest total score as the first antenna combination. In this implementation, the radio frequency reference score and the key factor score that are of each antenna combination are calculated to obtain an optimal antenna combination, so that MIMO performance of the selected optimal antenna combination is the same as performance achieved before switching is performed, thereby ensuring Wi-Fi quality achieved after switching is performed.

With reference to the first aspect, in another possible implementation of the first aspect, after the using the first antenna combination to perform communication for the second application program, the method further includes: The terminal obtains a key factor and a radio frequency indicator that are measured when the first antenna combination is used. When a total score calculated based on the key factor and the radio frequency indicator that are measured when the first antenna combination is used is less than a first threshold, the terminal re-obtains key factors and radio frequency indicators that are of the m+n antenna combinations, and determines a second antenna combination based on the re-obtained key factors and radio frequency indicators that are of the m+n antenna combinations. In this implementation, after selecting and switching to the first antenna combination, the terminal continues to detect quality of the current antenna combination after a period of time. If the total score is less than the first threshold, measurement of each antenna combination and antenna combination switching are triggered again, thereby ensuring persistence and stability of Wi-Fi performance.

Optionally, the first threshold is a preset value, and may be obtained through statistics collection or simulation.

With reference to the first aspect, in still another possible implementation of the first aspect, the method further includes: when the terminal is in the Wi-Fi connected state and a portrait state, using the m primary antennas to perform communication for the first application program.

With reference to the first aspect, in still another possible implementation of the first aspect, n≥1, and one of the at least one secondary antenna is disposed in a position of a center, an upper bezel, or a lower bezel of the terminal that is in the landscape state.

With reference to the first aspect, in still another possible implementation of the first aspect, that one secondary antenna is disposed in a position of a center of the terminal that is in the landscape state includes: being disposed in the position of the center of the terminal that is in the landscape state, or within a range covered by a circle centered at the center and with a radius not exceeding 30% of a preset width, where the preset width is a width from the center position to the upper bezel or the lower bezel of the terminal that is in the landscape state. In this implementation, the newly added secondary antenna is disposed in or near the position of the center of the terminal that is in the landscape state, thereby avoiding that a secondary antenna is blocked when a user holds the terminal in a landscape mode, further enabling that a switched-to antenna combination can ensure Wi-Fi performance of the user, and not reducing user experience.

With reference to the first aspect, in still another possible implementation of the first aspect, the n secondary antennas include at least one of the following: a monopole antenna, an inverted F antenna IFA, a planar inverted F antenna PIFA, a patch antenna, a loop antenna, a slot antenna, and the like.

Optionally, the m primary antennas may also include one or more of a monopole antenna, an inverted F antenna IFA, a planar inverted F antenna PIFA, a patch antenna, a loop antenna, a slot antenna, and the like.

According to a second aspect, this application further provides a terminal. The terminal includes m primary antennas, where m≥1, and further includes n secondary antennas, where n≥1. One of the n secondary antennas is disposed in a position of a center, an upper bezel, or a lower bezel of the terminal that is in a landscape state. The m primary antennas are configured to perform communication and transmission for a first application program that runs when the terminal is in a portrait state. The n secondary antennas are configured to perform communication for a second application program after being combined with the m primary antennas when the terminal is in the Wi-Fi connected state and the landscape state.

With reference to the second aspect, in a possible implementation of the second aspect, that one secondary antenna is disposed in a position of a center of the terminal that is in a landscape state includes: The one secondary antenna is disposed in the position of the center of the terminal that is in the landscape state, or the one secondary antenna is disposed within a range covered by a circle centered at the center and with a radius not exceeding 30% of a preset width, where the preset width is a width from the center position to the upper bezel or the lower bezel of the terminal that is in the landscape state.

With reference to the second aspect, in another possible implementation of the second aspect, the n secondary antennas include at least one of the following: a monopole antenna, an inverted F antenna IFA, a planar inverted F antenna PIFA, a patch antenna, a loop antenna, and a slot antenna.

With reference to the second aspect, in still another possible implementation of the second aspect, the n secondary antennas are specifically configured to use a highest-priority first antenna combination of m+n antenna combinations to perform communication for the second application program, where the first antenna combination includes at least one of the secondary antennas, the first antenna combination is determined based on a key factor and a radio frequency indicator, the key factor includes one or more of an application delay, a received signal strength indicator RSSI, a signal-to-noise ratio SNR, and a packet loss rate, and the radio frequency indicator includes one or more of antenna receiver sensitivity, a transmit power, error vector magnitude, a radiation pattern, and an extreme Wi-Fi throughput.

With reference to the second aspect, in still another possible implementation of the second aspect, the first antenna combination is an antenna combination with the highest total score in the m+n antenna combinations, where the total score is a sum of the radio frequency reference score and the key factor score, the radio frequency reference score is determined based on the radio frequency factor, and the key factor score is obtained through calculation by using the key factor.

According to a third aspect, this application further provides a terminal, including a processor and a memory. The processor is coupled to the memory, and the memory is configured to store an instruction. The processor is configured to invoke the instruction to enable the terminal to perform the antenna selection method in the first aspect and the various implementations of the first aspect.

Optionally, the terminal may be the terminal or terminal device according to the second aspect.

According to a fourth aspect, this application further provides a chip. The chip includes a processor and an interface. The interface is coupled to the processor. Optionally, the interface includes an interface circuit.

The processor is configured to execute a computer program or an instruction and implement the following method steps: when a terminal is in a Wi-Fi connected state and a landscape state, obtaining a key factor and a radio frequency indicator that are of each of m+n antenna combinations; determining a first antenna combination based on the key factor and the radio frequency indicator, where the first antenna combination is a first-priority antenna combination of the m+n antenna combinations, and the first antenna combination includes at least one of the secondary antennas;

and using the first antenna combination to perform communication for a second application program. The interface is configured to communicate with another module other than the chip.

m represents a quantity of primary antennas configured for a first application program, and m≥1. n represents a quantity of the secondary antennas, and n≥1. The n secondary antennas may be configured to perform communication for the second application program, or perform communication for the second application program after being combined with at least one of the m primary antennas. The key factor includes one or more of an application delay, a received signal strength indicator RSSI, a signal-to-noise ratio SNR, and a packet loss rate. The radio frequency indicator includes one or more of antenna receiver sensitivity, a transmit power, error vector magnitude, a radiation pattern, and an extreme Wi-Fi throughput.

With reference to the fourth aspect, in a possible implementation of the fourth aspect, the processor is further configured to execute the computer program or the instruction and implement the following steps: calculating a key factor score of each antenna combination based on the key factor; determining a radio frequency reference score of each antenna combination based on the radio frequency indicator; calculating a total score of each antenna combination, where the total score is a sum of the radio frequency reference score and the key factor score; and selecting an antenna combination with a highest total score as the first antenna combination.

With reference to the fourth aspect, in another possible implementation of the fourth aspect, the processor is further configured to execute the computer program or the instruction and implement the following steps: after the using the first antenna combination to perform communication for a second application program, obtaining a key factor and a radio frequency indicator that are measured when the first antenna combination is used, when a total score calculated based on the key factor and the radio frequency indicator that are measured when the first antenna combination is used is less than a first threshold, re-obtaining key factors and radio frequency indicators that are of the m+n antenna combinations, and determining a second antenna combination based on the re-obtained key factors and radio frequency indicators that are of the m+n antenna combinations.

With reference to the fourth aspect, in still another possible implementation of the fourth aspect, the processor is further configured to execute the computer program or the instruction and implement the following step: when the terminal is in the Wi-Fi connected state and a portrait state, using the m primary antennas to perform communication for the first application program.

Optionally, the secondary antennas include at least one of the following: a monopole antenna, an inverted F antenna IFA, a planar inverted F antenna PIFA, a patch antenna, a loop antenna, and a slot antenna.

According to a fifth aspect, this application further provides a computer readable storage medium, including an instruction. When the instruction is run on a computer, the method according to the first aspect or the various implementations of the first aspect is implemented.

According to a sixth aspect, this application further provides a computer program product. When the computer program product is run on a computer, the method according to the first aspect or the various implementations of the first aspect is implemented.

According to the method provided in the embodiments, the n secondary antennas are added to the terminal with an m*m antenna Wi-Fi capability provided by the m primary antennas and n secondary antennas, so that an antenna Wi-Fi capability is increased to be provided by the m+n antenna combinations, and the highest-priority first antenna combination is determined based on the key factor and the radio frequency indicator that are of each of the m+n antenna combinations. Because the first antenna combination includes at least one of the secondary antennas, use of the secondary antenna for communication of the second application program resolves a "death grip" problem caused when a user holds the terminal in the landscape mode. In addition, according to this method, the first antenna combination selected based on the key factor and the radio frequency indicator has optimal Wi-Fi performance in a MIMO technical scenario, thereby ensuring antenna communication quality achieved after switching is performed and improving user experience.

DESCRIPTION OF EMBODIMENTS

Before the technical solutions in the embodiments of this application are described, an application scenario in the embodiments of this application is described.

The technical solutions in this application may be applied to various mobile communications systems, for example, may be applied to a new radio (new radio, NR) system in a 5th generation (5th generation, 5G) mobile communications system, or a future mobile communications system. This is not limited in this application.

The technical solutions in this application are specifically applied to wireless networks of a base station and at least one terminal, for example, a Wi-Fi network. Further, the terminal may also be referred to as a terminal device, user equipment (user equipment, UE), a mobile station (mobile station, MS), a mobile terminal (mobile terminal, MT), or the like. The terminal may be a mobile phone (mobile phone), a tablet computer (Pad), a computer with a wireless transceiver function, a virtual reality (virtual reality, VR) terminal device, an augmented reality (Augmented Reality, AR) terminal device, a wireless terminal in industrial control (industrial control), a wireless terminal in self driving (self driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), or the like. A specific technology and a specific device form that are used by the terminal are not limited in the embodiments of this application.

The terminal in the embodiments of this application is a terminal device with a Wi-Fi capability. Further, the terminal device with a Wi-Fi capability is a terminal device with a multiple-input multiple-output (multiple-input multiple-output, MIMO) capability, for example, an m*m terminal. When m=2, the terminal device is a 2-transmitter 2-receiver (2 transmitter 2 receiver, 2T2R) terminal; or when m=4, the terminal device is a 4T4R terminal.

Figure 1:
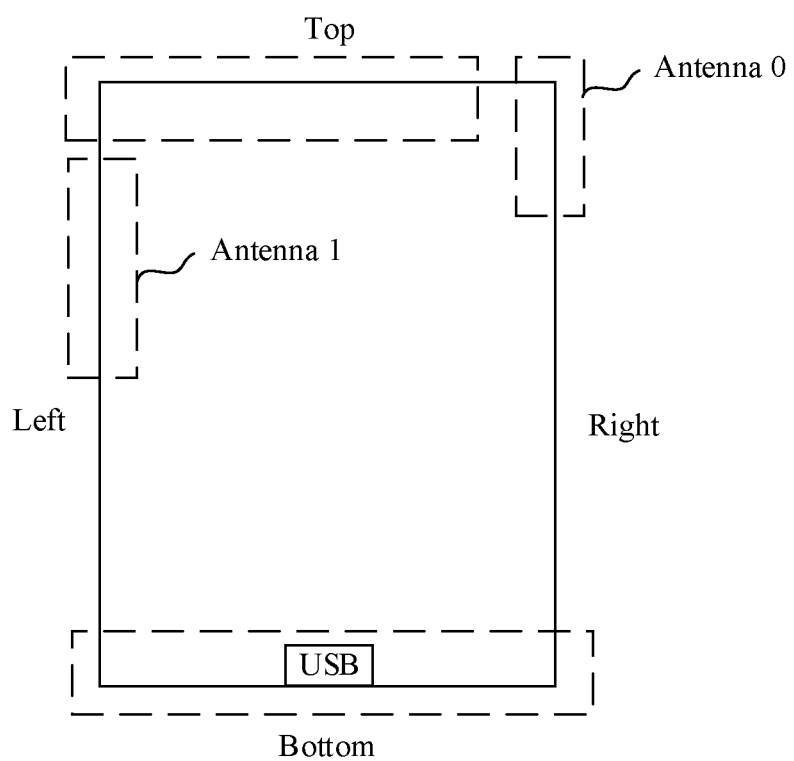
FIG. 1 is a schematic diagram of distribution of positions of antennas according to this application.
Figure 2A:
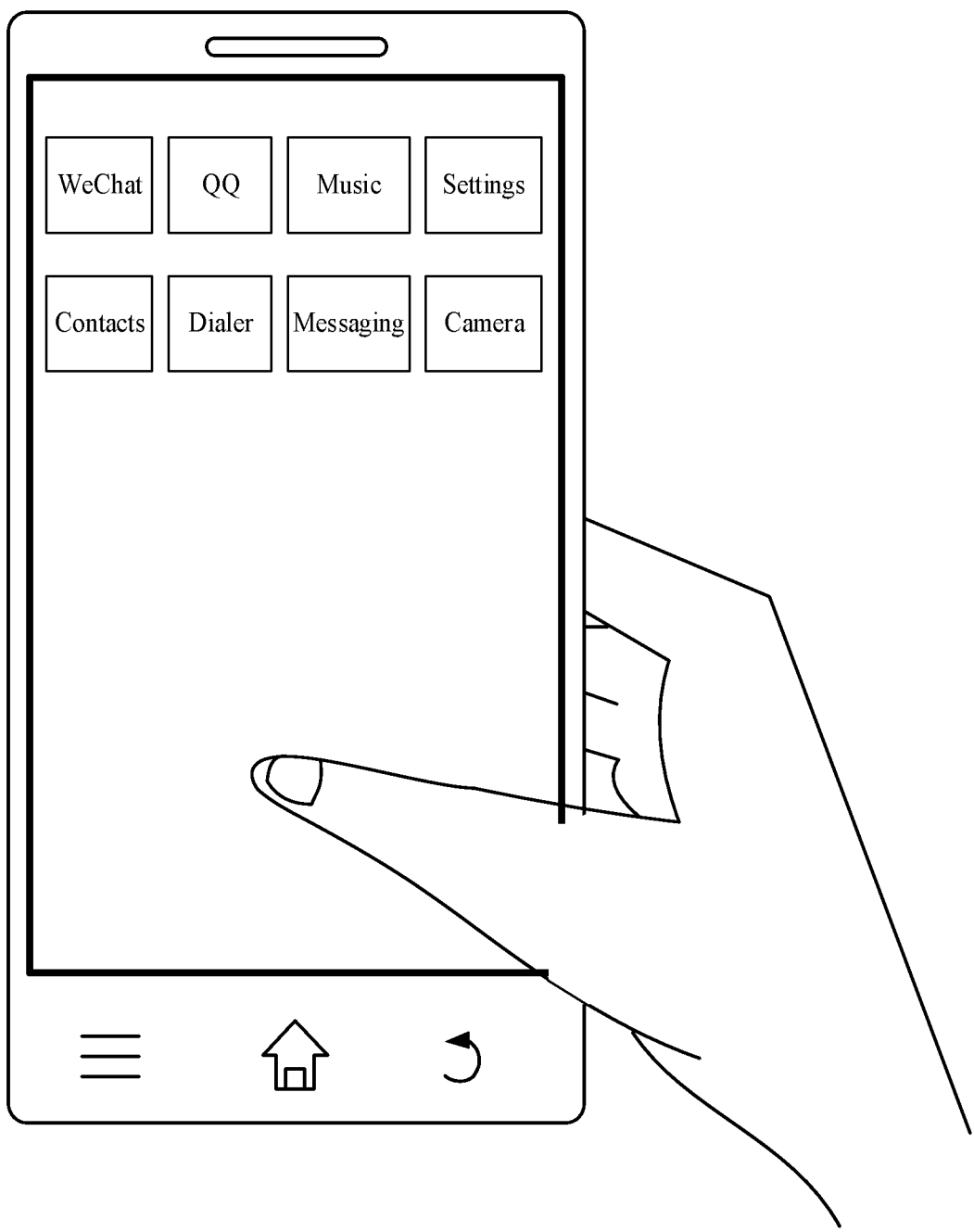
FIG. 2a is a schematic diagram of a terminal in a portrait state according to an embodiment of this application.
Figure 2B:
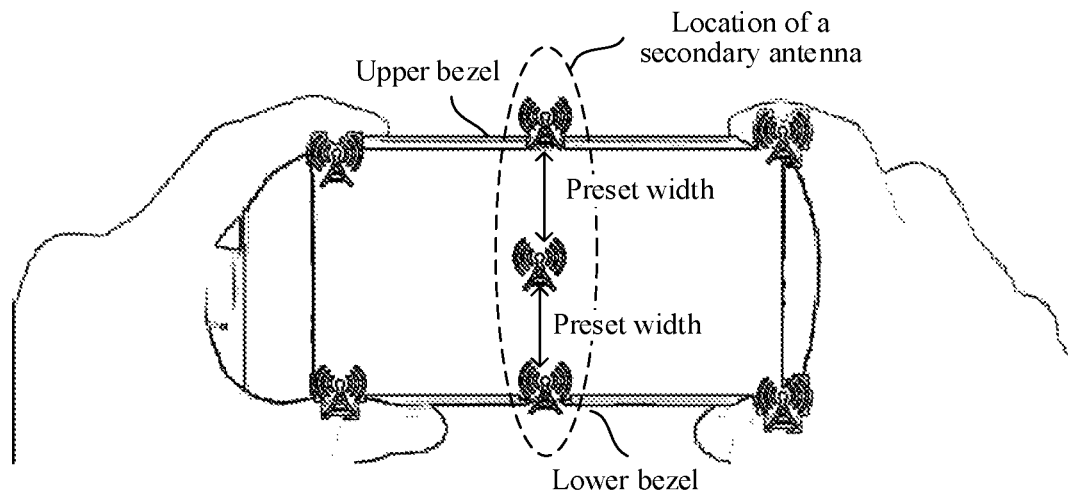
FIG. 2b is a schematic diagram of a terminal in a landscape state according to an embodiment of this application.

The technical solutions in this application may be applied to antenna selection when a terminal is in a landscape state. Generally, the terminal includes two states: a portrait state and the landscape state. Specifically, as shown in FIG. 2a, when being in the portrait state or in a portrait mode, the terminal may perform communication and a service that are of a first application program, for example, a dial-up calling service or a WeChat message receiving and sending service. In this case, a user holds the terminal, and the communication and the service that are of the first application program use at least one primary antenna disposed in a position of a corner or bezel of the terminal. When being in the landscape state, as shown in FIG. 2b, the terminal may perform communication and a service that are of a second application program, for example, a game program or application. The second application program running when the terminal is in the landscape state is a full-screen service of the terminal.

In the embodiments of this application, on a basis of an original primary-antenna combination of the terminal, at least one antenna selection system (transmit antenna selection, TAS) antenna or WiTAS (Wi-Fi TAS) antenna is added as a secondary antenna system. As shown in FIG. 2b, when the terminal is in the landscape state, at least one TAS antenna is disposed in a position of a center or a middle part of the terminal, and a position of the secondary antenna is a position not easily blocked by a hand when the terminal is in the landscape state.

Usually, the primary antenna of the terminal is disposed in a position of a corner or bezel, and the secondary antenna of the terminal is disposed in or near a position of a center of the terminal that is in the landscape state. A terminal shown in FIG. 2c includes two primary antennas (antenna, ANT), namely, an ANT 1 and an ANT 2, and further includes a secondary antenna ANT 3. The ANT 1 and the ANT 2 are disposed in an upper left corner and an upper right corner of the terminal, respectively. The ANT 3 is disposed in a position of a center of the terminal that is in the landscape state, for example, under a battery cover, under a position of a center of a screen or around a point that is under the position of the center of the screen, or on radiators on two sides. A location of the ANT 3 is not easy to be held by a palm.

Optionally, both the ANT 1 and the ANT 2 are antenna modules with GPS and Wi-Fi functions.

Optionally, the ANT 3 is an antenna module with the Wi-Fi function, for example, a Wi-Fi antenna. Further, the secondary antenna may be circuit-multiplexed by a plurality of systems. The plurality of systems include but are not limited to a cellular (cellular) system, a Wi-Fi system, a global navigation satellite system (global navigation satellite system, GNSS), a Bluetooth (Bluetooth) system, and a 5G-NR system.

Figure 2C:
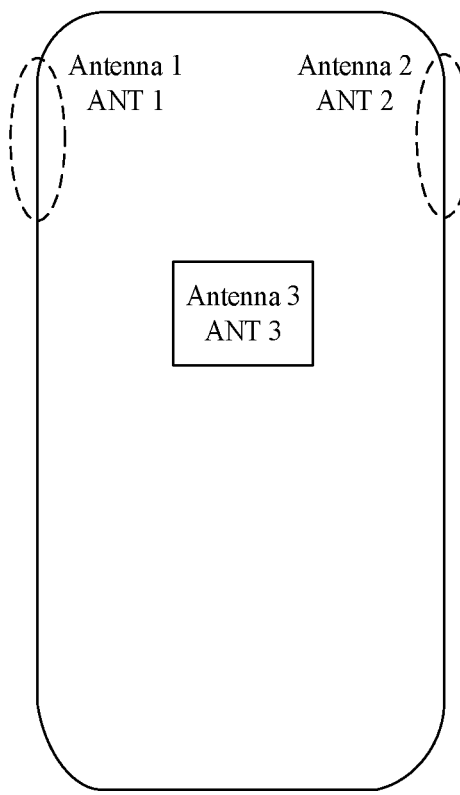
FIG. 2c is a schematic diagram of distribution of positions of antennas according to an embodiment of this application.
Figure 2D:
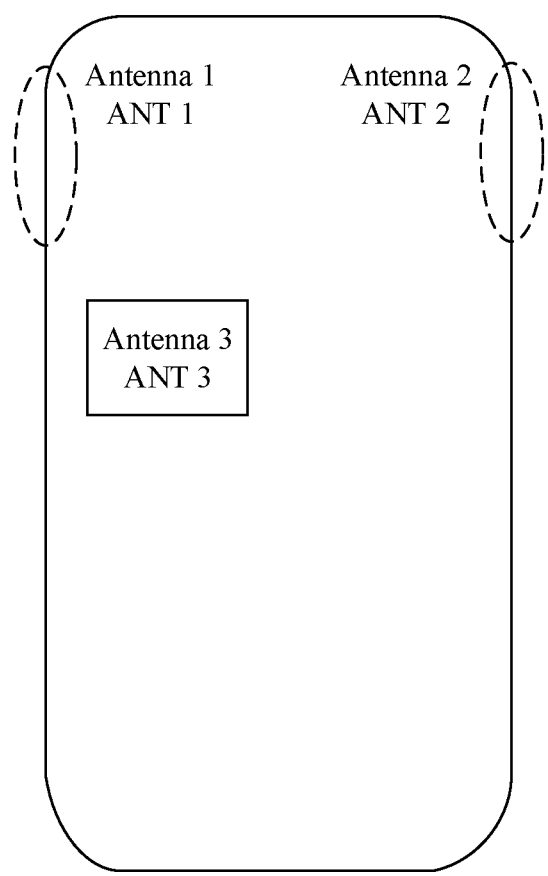
FIG. 2d is a schematic diagram of distribution of a position of a secondary antenna according to an embodiment of this application.
Figure 2E:
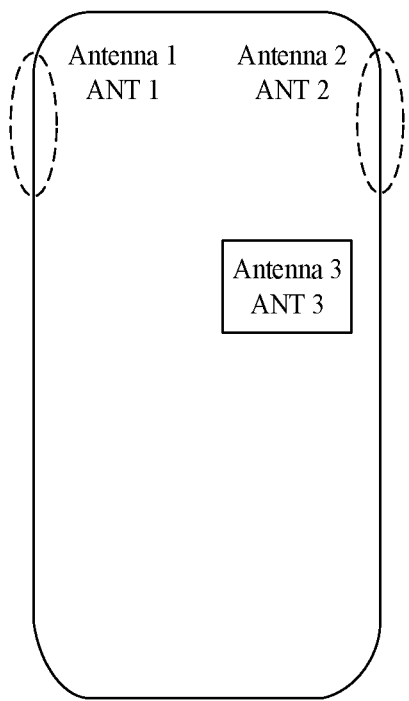
FIG. 2e is a schematic diagram of another distribution of a position of a secondary antenna according to an embodiment of this application.

Optionally, in another possible implementation, as shown in FIG. 2d and FIG. 2e, that the secondary antenna is disposed in a position of a center of the terminal that is in the landscape state includes: The secondary antenna is disposed within a range, of the terminal that is in the landscape state, covered by a circle centered at the center and with a radius not exceeding 30% of a preset width, where the preset width is a width from the center position to an upper bezel or a lower bezel of the terminal that is in the landscape state. The ANT 3 shown in FIG. 2c is arranged in a position near the upper bezel of the terminal that is in the landscape state, and the ANT 3 shown in FIG. 2d is arranged in a position near the lower bezel of the terminal that is in the landscape state.

Figure 2F:
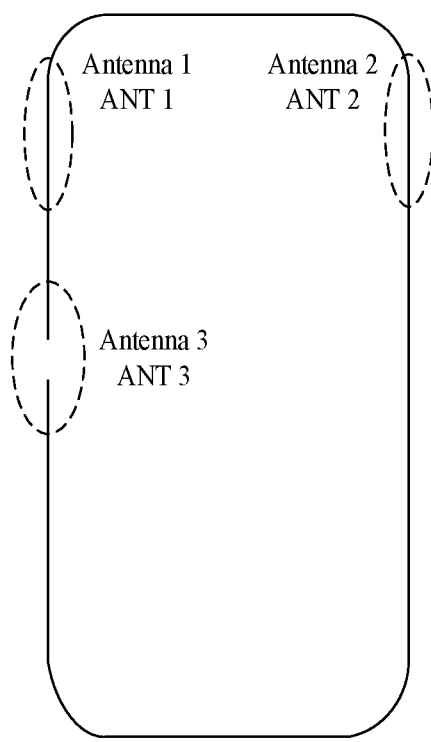
FIG. 2f is a schematic diagram of still another distribution of a position of a secondary antenna according to an embodiment of this application.
Figure 2G:
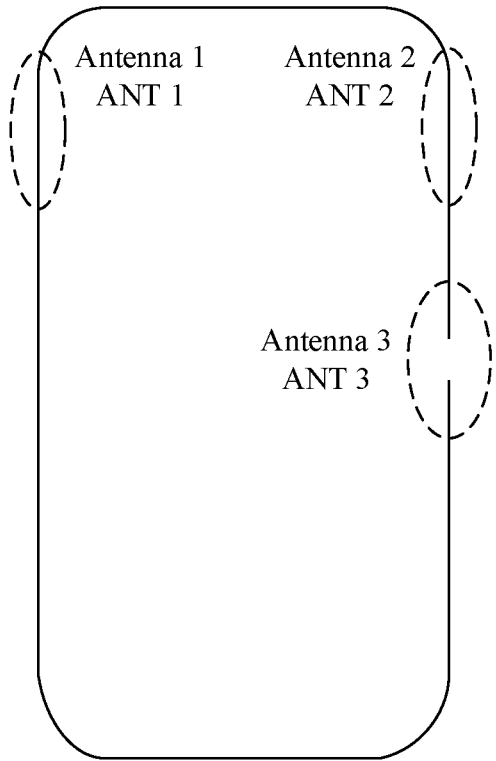
FIG. 2g is a schematic diagram of still another distribution of a position of a secondary antenna according to an embodiment of this application.

Optionally, in still another possible implementation, the secondary antenna may be alternatively disposed in positions of an upper bezel and a lower bezel of the terminal that is in the landscape state. As shown in FIG. 2f, the ANT 3 is arranged in a slot in the upper bezel of the terminal that is in the landscape state. Further, the ANT 3 is an inverted F antenna (inverted F antenna, IFA). Likewise, as shown in FIG. 2g, the ANT 3 is arranged in a slot in the lower bezel of the terminal that is in the landscape state.

Optionally, the secondary antenna includes any one or more of the following: a monopole (monopole) antenna, an IFA, a planar inverted F antenna (planar inverted F antenna, PIFA), a patch (patch) antenna, a loop (loop) antenna, and a slot antenna.

Optionally, the secondary antenna is a dual-band antenna supporting 2.4G and/or 5G.

In this application, for selection of a secondary antenna, parameters such as an application delay, for example, a game delay, a received signal strength indicator (received signal strength indicator, RSSI), a signal-to-noise ratio (signal-noise ratio, SNR), and a packet loss rate may be periodically detected when a user holds a terminal in a landscape mode, and when a Wi-Fi score is poor, antenna combination traversal and selection are performed.

Because n secondary antennas are newly added to original m primary antennas of the terminal, different antenna combinations, for example, m+n antenna combinations, may be formed after the n secondary antennas are combined with the originally configured m primary antennas. Considering that effects of a MIMO technology are different under different antenna combinations, radio frequency indicators of the various antenna combinations need to be measured in advance, reference scores are provided, then total scores are calculated with reference to a user scenario and factors such as an application delay, an antenna-measured RSSI, a packet loss rate, and a signal-to-noise ratio, and an optimal antenna combination is selected to effectively resolve a "death grip" problem of the terminal, improve Wi-Fi performance, and improve user experience.

Figure 3:
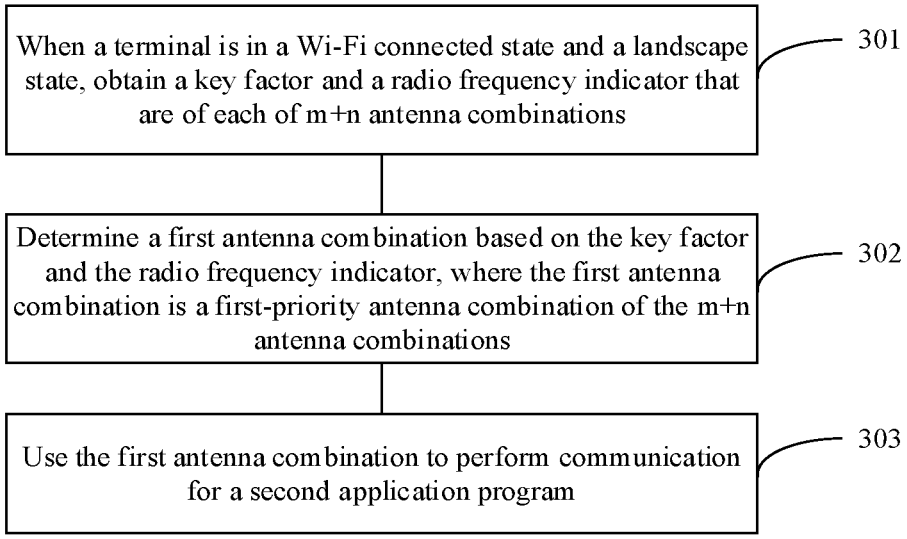
FIG. 3 is a flowchart of an antenna selection method according to an embodiment of this application.

As shown in FIG. 3, this embodiment provides an antenna selection method. The method is applied to a terminal for which m primary antennas and n secondary antennas are configured, where m≥1 and n≥1. The m primary antennas are configured for communication and a service that are of a first application program running when the terminal is in a portrait state. The n secondary antennas may be configured for communication and a service that are of a second application program running when the terminal is in a landscape state. Optionally, the secondary antennas are WiTAS antennas. The method includes the following steps.

Step 301: When the terminal is in a Wi-Fi connected state and a landscape state, obtain a key factor and a radio frequency indicator that are of each of m+n antenna combinations.

The key factor includes one or more of an application delay, an RSSI, an SNR, and a packet loss rate.

The radio frequency indicator includes one or more of the following: antenna receiver sensitivity (receiver sensitivity), a transmit power (Tx power), error vector magnitude (error vector magnitude, EVM), a radiation pattern (radiation pattern), an extreme Wi-Fi throughput, and the like.

Specifically, the antenna receiver sensitivity is a minimum signal received power at which a receiver can correctly obtain a wanted signal.

The transmit power is a strength of a signal transmitted to a base station when a device (for example, a mobile phone, a network adapter, or a walkie-talkie) is used.

An error vector in the EVM is a vector difference between an ideal error-free reference signal and an actual transmitted signal at a given moment. The vector difference may be used for comprehensive measurement of a magnitude error and a phase error that are of a modulated signal. The error vector includes a magnitude vector and a phase vector.

The EVM may be defined as a ratio of a root mean square value of an average power of an error vector signal and a root mean square value of an average power of an ideal signal, and is expressed in a form of a percentage. A smaller EVM indicates better signal quality. The EVM specifically indicates closeness of an IQ component generated when a transmitter demodulates a signal to an ideal signal component, and is an indicator indicating quality of a modulated signal.

The radiation pattern is a graph describing dependence between an intensity and a direction (angle) that are of a radio wave emitted by an antenna or another signal source. The radiation pattern is a mathematical function or a graphical spatial coordinate function representing a radiation characteristic of an antenna.

In addition, the extreme Wi-Fi throughput is a largest throughput in Wi-Fi transmission of each antenna combination measured in an environment without interference from an external factor. Further, the throughput is an amount of data (measured in bits, bytes, packets, or the like) successfully transported in a unit time for a network, a device, a port, a virtual circuit, or another facility.

Optionally, a unit of the throughput is bits per second (bits per second, bps). In this embodiment, the extreme Wi-Fi throughput may reach megabits per second (Mbps), and 1 MB=1024 KB.

The foregoing radio frequency indicators may be obtained through presetting and measurement.

Before step 301, the method further includes: when detecting that the terminal is in the Wi-Fi connected state and the terminal is in the landscape state, starting measurement of the m+n antenna combinations. The measurement of the m+n antenna combinations may be implemented by a switching circuit.

Step 302: Determine a first antenna combination based on the key factor and the radio frequency indicator.

The first antenna combination is a first-priority antenna combination of the m+n antenna combinations, and the first antenna combination includes at least one of the secondary antennas.

Figure 4:
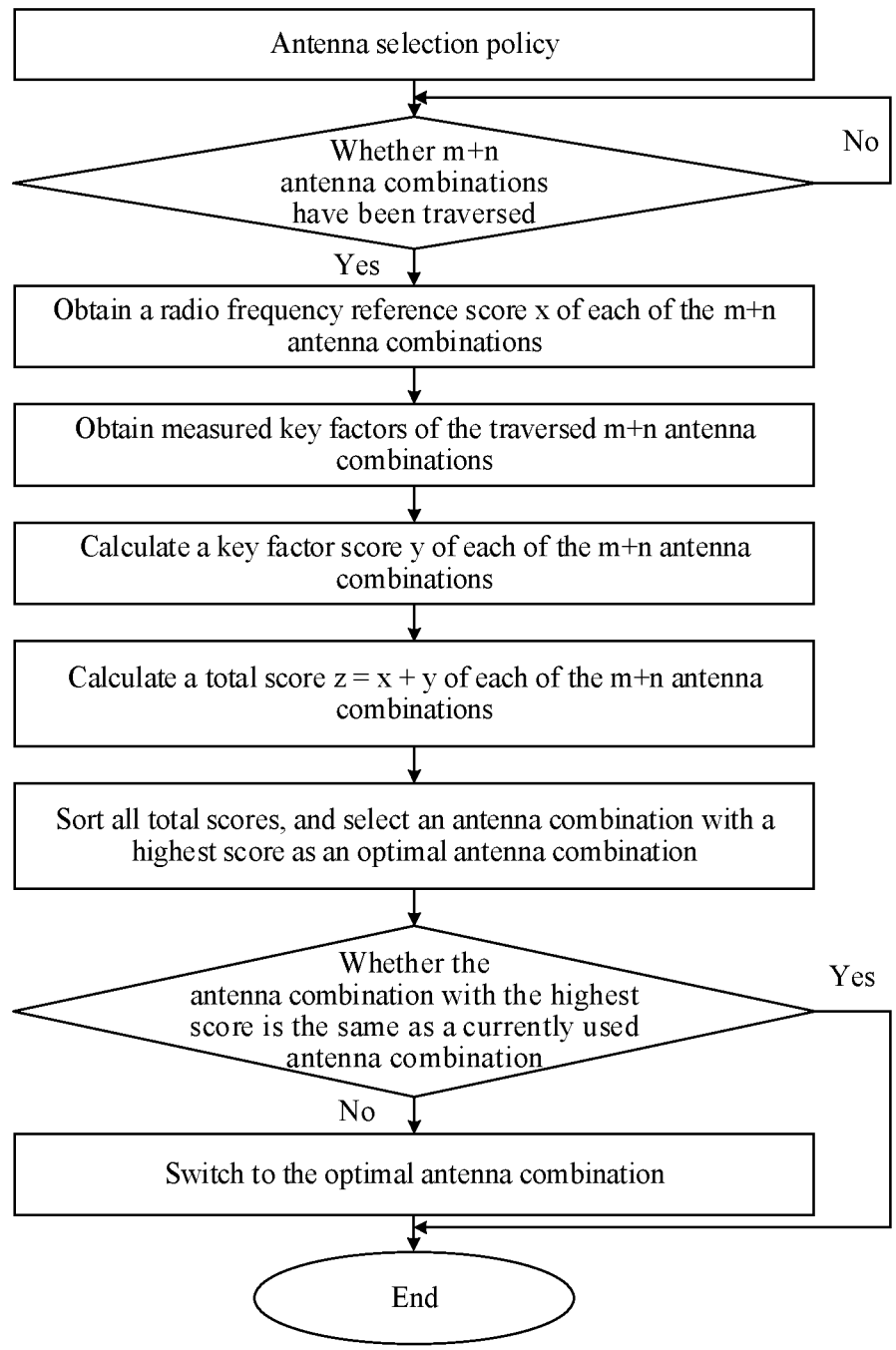
FIG. 4 is a flowchart of another antenna selection method according to an embodiment of this application.

Specifically, as shown in FIG. 4, the method includes: The terminal obtains, according to an antenna selection policy, the key factors corresponding to the m+n antenna combinations; after traversing the m+n antenna combinations, the terminal obtains radio frequency reference scores of the m+n antenna combinations, where, for example, the radio frequency reference score is represented by "x"; and the terminal obtains measured key factors of the traversed m+n antenna combinations, and calculates a key factor score of each antenna combination according to a rule, where it is assumed that the key factor score is represented by "y".

The rule is shown in Table 1 and includes the following.

TABLE 1

| Serial number item | Full score | Point deduction rule |
|---|---|---|
| 1 | Total score: 120 points | |
| 2 | Radio frequency reference score: 30 points | Related to each radio frequency indicator. |
| 3 | RSSI: 30 points | ≥−60 dBm: 30 points<br>−61 dBm to −70 dBm: including end values, with 1 dBm as a unit, and 1 point deducted for every decrease of 1 dBm<br>−71 dBm to −80 dBm: including end values, with 1 dBm as a unit, and 2 points deducted for every decrease of 1 dBm until all points are deducted |
| 4 | Packet loss rate: 30 points | No packet loss: 30 points<br>1% to 15%: including end values, 2 points deducted for every increase of 1% until all points are deducted |
| 5 | SNR: 10 points | ≥100 dB: 10 points |

TABLE 1-continued

| Serial number item | Full score | Point deduction rule |
|---|---|---|
| | | 99 dB to 60 dB: including end values, with 1 dB as a unit, and 0.25 points deducted for every decrease of 1 dB until all points are deducted |
| 6 | Application delay: 20 points | Application not stalled: no point deducted Application stalled: 20 points deducted |

The terminal calculates the key factor score y and a total score according to the rule shown in Table 1, then sorts scores of the combination, and selects an antenna combination with a highest total score.

It may be understood that in this embodiment, only one rule is used as an example for calculating the key factor score and the total score, and another similar rule may be further included. This is not limited in this embodiment.

That the terminal determines a first antenna combination based on the key factor and the radio frequency indicator specifically includes: calculating a key factor score of each antenna combination based on the key factor; determining a radio frequency reference score of each antenna combination based on the radio frequency indicator; calculating a total score of each antenna combination, where the total score is a sum of the radio frequency reference score and the key factor score; and selecting an antenna combination with the highest total score as a first-priority antenna combination in the m+n antenna combinations. The antenna combination with the highest total score is the first-priority antenna combination, that is, the first antenna combination.

The first antenna combination may include only one secondary antenna, or may include a combination of one secondary antenna and at least one primary antenna. This is not limited in this embodiment.

Step 303: Use the first antenna combination to perform communication for the second application program.

Optionally, if an antenna combination currently used by the terminal is the same as the first antenna combination, the terminal continues using the antenna combination for communication; or if an antenna combination currently used by the terminal is different from the first antenna combination, the terminal switches to the first antenna combination, to improve Wi-Fi performance.

According to the method provided in this embodiment, the n secondary antennas are added to the terminal with an m*m antenna Wi-Fi capability provided by the m primary antennas and n secondary antennas, so that an antenna Wi-Fi capability is increased to be provided by the m+n antenna combinations, and the highest-priority first antenna combination is determined based on the key factor and the radio frequency indicator that are of each of the m+n antenna combinations. Because the first antenna combination includes at least one of the secondary antennas, use of the secondary antenna for communication of the second application program resolves a "death grip" problem caused when a user holds the terminal in a landscape mode. In addition, in this method, the first antenna combination selected based on the key factor and the radio frequency indicator has optimal Wi-Fi performance in a MIMO technical scenario, thereby ensuring antenna communication quality achieved after switching is performed and improving user experience.

In addition, in this embodiment, after an antenna in the first antenna combination is used for communication, the method further includes: The terminal obtains a key factor and a radio frequency indicator that are measured when the first antenna combination is used; and when a total score calculated based on the key factor and the radio frequency indicator that are measured when the first antenna combination is used is less than a first threshold, the terminal re-obtains key factors and radio frequency indicators that are of the m+n antenna combinations, and determines a second antenna combination based on the re-obtained key factors and radio frequency indicators that are of the m+n antenna combinations. The second antenna combination is the first-priority antenna combination at a current measurement moment, that is, an antenna combination with the highest total score.

The first threshold may be preset based on a transmission environment.

Specifically, after the first antenna combination is selected for use, a freeze operation is performed, thereby avoiding frequent triggering of switching. After a period of time, the freezing ends. Then, monitoring of the key factors such as the application delay, the RSSI, the SNR, and the packet loss rate is continued. If a corresponding threshold is reached, operations of traversing the antenna combinations and selecting an optimal antenna are re-triggered. In a process of performing these operations, if it is detected that the user's operation of holding the terminal in a landscape mode ends, for example, when the terminal exits a game mode or a Wi-Fi connection is disconnected, the terminal ends an operation of re-triggering antenna combination switching, and starts the operation again when a trigger condition is met next time.

Optionally, the freeze operation may be understood as not traversing the m+n antennas for measurement within a period of time, for example, within 30 seconds.

In this method, after the terminal switches to the first antenna combination, the terminal detects, after a period of time, antenna transmission quality again, and determines, based on the detected key factors, whether to perform antenna combination switching again, thereby ensuring that a switched-to antenna combination is always an optimal communication mode, ensuring continuity of Wi-Fi performance, and improving user experience.

Optionally, the method provided in this embodiment further includes: when the terminal is in the Wi-Fi connected state and a portrait state, using the m primary antennas to perform communication for the first application program.

Figure 5:
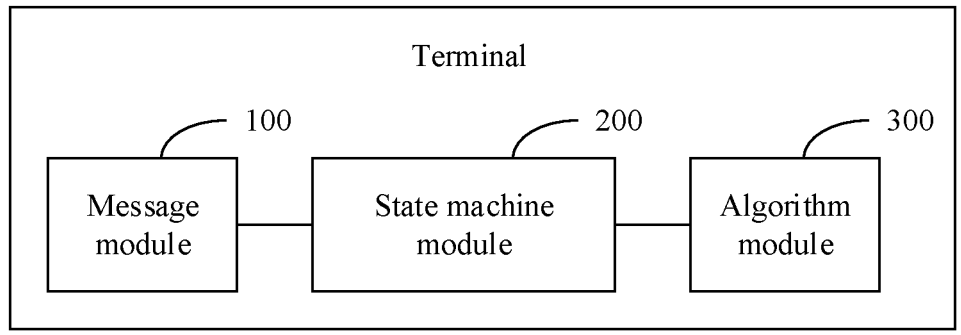
FIG. 5 is a schematic structural diagram of a terminal according to an embodiment of this application.

As shown in FIG. 5, a terminal provided in this embodiment may include a message module 100, a state machine module 200, and an algorithm module 300. In addition, the terminal may further include another module or unit.

Figure 6:
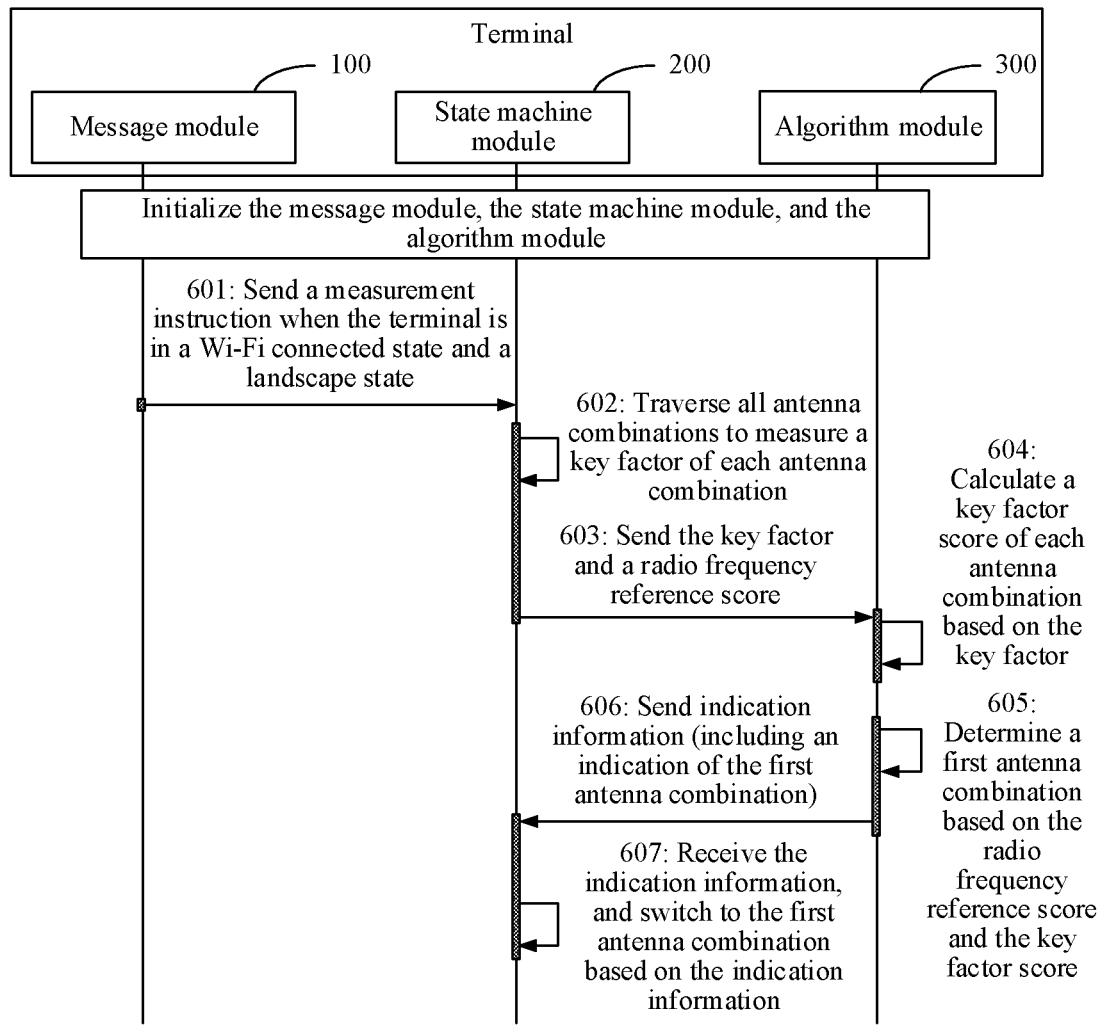
FIG. 6 is a signaling flowchart of still another antenna selection method according to an embodiment of this application.

In a specific embodiment, an antenna selection method is provided. As shown in FIG. 6, the method includes the following steps.

A message module 100, a state machine module 200, and an algorithm module 300 are initialized. Specifically, the initialization may be a power-on operation performed by a user, touching a screen to light up a terminal screen, or the like.

Step 601: When a terminal is in a Wi-Fi connected state and a landscape state, the message module sends a measurement instruction to the state machine module, to enable the terminal to start measurement of each antenna combination.

Step 602: The state machine module receives the measurement instruction from the message module, and traverses all the antenna combinations to measure a key factor of each antenna combination.

The key factor includes one or more of an application delay, an RSSI, an SNR, a packet loss rate, and the like.

Specifically, in a case of the first antenna combination, the state machine module measures the first group of key factors at a time interval t1; in a case of the second antenna combination, the state machine module measures the second group of key factors at a time interval t2; and in a case of the $(m+n)^{th}$ antenna combination, the state machine module measures the $(m+n)^{th}$ group of key factors at a time interval tn.

In this embodiment, an example is provided to describe how the m+n antenna combinations are traversed. There are two primary antennas (2T2R) numbered 1 and 2, and one secondary antenna is added and numbered 3. The three antennas totally correspond to three antenna combination manners, and are as follows: a combination 1 {1,2}, a combination 2 {1,3}, and a combination 3 {2,3}.

TABLE 2

| | RSSI | Packet loss rate | SNR | Application delay | Key factor score |
|---|---|---|---|---|---|
| Combination 1 {1, 2} | −70 dBm | 8% | 80 dB | Application not stalled (−0 points) | 39 |
| Combination 2 {1, 3} | −60 dBm | 5% | 90 dB | Application not stalled (−0 points) | 57.5 |
| Combination 3 {2, 3} | −80 dBm | 3% | 85 dB | Application stalled (−20 points) | 30.25 |

According to the rule in Table 1 above, key factor scores of the combinations calculated based on the key factors are as follows:

key factor score=RSSI (30 points)+packet loss rate (30 points)+SNR (10 points)+application delay score;

combination 1: key factor score=(30−10)+(30−8×2)+(10−20×0.25)=39;

combination 2: key factor score=30+(30−5×2)+(10−10×0.25)=57.5; and combination 3: key factor score=(30−10−10×2)+(30−3×2)+(10−15×0.25)=30.25.

Step 603: The state machine module sends the measured key factor and a pre-obtained radio frequency reference score to the algorithm module.

Step 604: The algorithm module receives the key factor and the radio frequency reference score, and calculates a key factor score of each antenna combination based on the key factor.

The radio frequency reference score is determined based on a radio frequency indicator. In this embodiment, radio frequency reference scores of the three antenna combinations are provided based on the radio frequency indicators such as antenna receiver sensitivity, a transmit power, EVM, a radiation pattern, and an extreme Wi-Fi throughput, and are as follows: combination 1: 28 points; combination 2: 25 points; and combination 3: 20 points.

Step 605: The algorithm module determines a first antenna combination (or an optimal antenna combination) based on the radio frequency reference score and the key factor score.

The following is specifically included: calculating a total score of each antenna combination, where the total score=the radio frequency reference score+the key factor score, and a full score of the total score is 100 points; and then, selecting an antenna combination with a highest total score as the first antenna combination.

For example, refer to Table 3.

TABLE 3

| Antenna combination {antenna No} | Radio frequency reference score (full score: 30) | Key factor score | Total score |
|---|---|---|---|
| Combination 1 {1, 2} | 28 | 39 | 67 |
| Combination 2 {1, 3} | 25 | 57.5 | 82.5 |
| Combination 3 {2, 3} | 20 | 30.25 | 50.25 |

In the three antenna combinations, the combination 2 {1,3} has a highest total score of 82.5 points. Therefore, the first antenna combination is the combination 2.

Step 606: The algorithm module sends indication information to the state machine module, where the indication information includes an indication of the first antenna combination. The first antenna combination is a first-priority antenna combination.

For example, the indication information sent by the algorithm module includes the following content: combination 2 {1,3}.

Step 607: The state machine module receives the indication information, and switches an antenna to the first antenna combination according to an indication of the indication information.

According to the method provided in this embodiment, n WiTAS antennas are added, so that a plurality of different antenna combinations are newly added on a basis of original m antennas. When being in the landscape state, the terminal detects the factors such as the application delay, the RSSI, the SNR, and the packet loss rate, and further selects the first antenna combination with the highest score. This avoids that Wi-Fi performance is affected because the original antenna is blocked when a user holds the terminal. By using this method, Wi-Fi performance can be effectively improved, and user experience can also be improved.

In addition, after step 607 of switching to a communication mode of the first antenna combination in this method, the method further includes: The terminal continues to detect the key factor when the first antenna combination is used. When a total score (a radio frequency reference score and a key factor score) calculated based on the currently detected key factor is less than a first threshold, the terminal starts re-traversal of the m+n antenna combinations for measurement, and determines a current antenna combination based on a result of the re-measurement.

Further, when an application is started on the terminal that is in the landscape state, the state machine module continues to monitor the application delay, for example, a game delay. If the application stalls, the terminal determines whether a total score in a current state is less than the first threshold. If the total score in the current state is less than the first threshold, the terminal re-traverses all the antenna combinations for measurement, calculates a total score of each antenna combination, selects an antenna combination that is optimal in the current state, and performs switching, thereby ensuring Wi-Fi performance and ensuring that user experience is not reduced.

Specifically, an example is used in which a currently optimal antenna combination selected in this embodiment is the combination 2 {1,3}.

For example, refer to Table 4.

TABLE 4

|  | RSSI | Packet loss rate | SNR | Application delay | Key factor score |
|---|---|---|---|---|---|
| Combination 2 {1, 3} | −60 dBm | 5% | 90 dB | Application not stalled (−0 points) | 57.5 |
| Combination 2 {1, 3} | −70 dBm | 5% | 90 dB | Application stalled (−20 points) | 27.5 |

In this embodiment, after the terminal uses the antenna 1 and the antenna 3 in the combination 2 for transmission and communication for a period of time, a total score obtained through measurement declines. For example:

combination 2: key factor score=(30−10)+(30−5×2)+(10−10×0.25)−20=27.5.

If a radio frequency reference score of the combination 2 is still 25 points, a total score=radio frequency reference score+key factor score=25+27.5=52.5.

It is determined that the current total score of the combination 2 is less than the threshold. In this embodiment, the current total score 52.5 of the combination 2 is less than 60 (the first threshold). In this case, the m+n antenna combinations need to be re-traversed for measurement, and a first-priority antenna combination need to be picked out for switching and use. A specific switching process is the same as the foregoing step 601 to step 607, and details are not described herein again.

Figure 7:
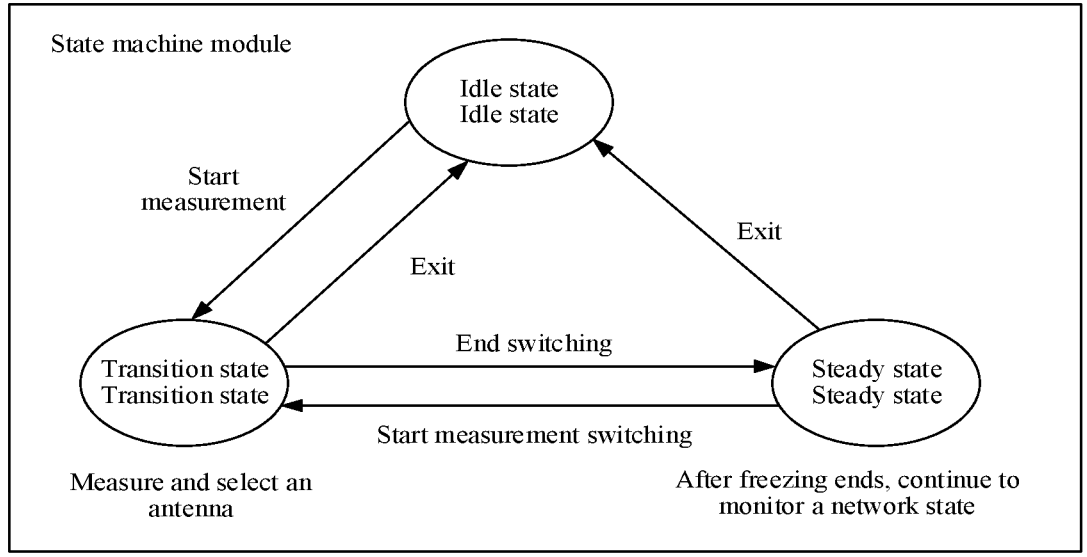
FIG. 7 is a schematic diagram of a state machine module according to an embodiment of this application.

In addition, in this embodiment, the state machine module 200 may further switch between different states in a measurement and information reporting process. Specifically, as shown in FIG. 7, the state machine module may include an idle state (idle state), a transition state (transition state), and a steady state (steady state).

The state machine module receives a message from the message module, performs a series of measurements to obtain a series of measurement data, and sends the measurement data to the algorithm module.

(a) Idle state (idle state): When the terminal is in a Wi-Fi connected state and a landscape state and an application is started on the terminal, the state machine module enters the transition state, and measurement is started.

(b) Transition state (transition state): The terminal traverses all the antenna combinations, measures and records the RSSI, the SNR, and the packet loss rate, and selects first-priority n antennas from n+1 antennas based on a statistical key factor value for use. After switching ends, the state machine module enters the steady state.

(c) Steady state (steady state): After the switching is performed, freezing persists for a period of time. After the freezing ends, the terminal continues to monitor factors such as a current application delay and a current RSSI, and determines whether to start a next measurement.

The following describes apparatus embodiments corresponding to the foregoing method embodiments.

Figure 8:
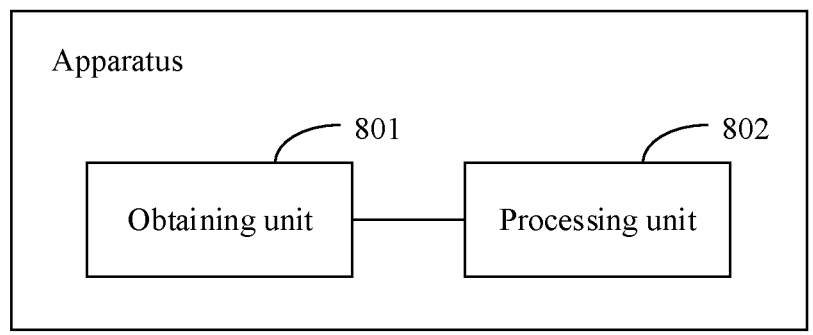
FIG. 8 is a schematic structural diagram of an antenna selection apparatus according to an embodiment of this application.

FIG. 8 is a schematic structural diagram of an antenna selection apparatus according to an embodiment of this application. The apparatus may be a terminal, for example, UE, or may be a component (for example, a chip) used in a terminal device. Further, the apparatus may implement functions or operations of the terminal in the foregoing embodiments. The terminal includes m primary antennas and n secondary antennas, where m≥1, n≥1, and both m and n are positive integers. The m primary antennas may be configured to perform communication for a first application program. The n secondary antennas may be configured to perform communication for a second application program, or perform communication for the second application program after being combined with at least one of the m primary antennas.

Optionally, the secondary antennas are TAS antennas or WiTAS antennas.

As shown in FIG. 8, the apparatus may include an obtaining unit 801 and a processing unit 802. Optionally, the apparatus may further include a sending unit, a storage unit, or another necessary unit or module.

Specifically, the obtaining unit 801 is configured to: when the terminal is in a Wi-Fi connected state and a landscape state, obtain a key factor and a radio frequency indicator that are of each of m+n antenna combinations. The processing unit 802 is configured to: determine a first antenna combination based on the key factor and the radio frequency indicator, where the first antenna combination is a first-priority antenna combination of the m+n antenna combinations, and the first antenna combination includes at least one of the secondary antennas; and use the first antenna combination to perform communication for the second application program.

The key factor includes one or more of an application delay, a received signal strength indicator RSSI, a signal-to-noise ratio SNR, and a packet loss rate. The radio frequency indicator includes one or more of antenna receiver sensitivity, a transmit power, error vector magnitude, a radiation pattern, and an extreme Wi-Fi throughput.

Optionally, in a specific implementation of this embodiment, the processing unit 802 is specifically configured to: calculate a key factor score of each antenna combination based on the key factor; determine a radio frequency reference score of each antenna combination based on the radio frequency indicator; calculate a total score of each antenna combination, where the total score is a sum of the radio frequency reference score and the key factor score; and select an antenna combination with a highest total score as the first antenna combination.

Optionally, in still another specific implementation of this embodiment, the processing unit 802 is further configured to: after using antennas in the first antenna combination for communication, obtain, by using the obtaining unit 801, a key factor and a radio frequency indicator that are measured when the first antenna combination is used; and when a total score calculated based on the key factor and the radio frequency indicator that are measured when the first antenna combination is used is less than a first threshold, re-obtain key factors and radio frequency indicators that are of the m+n antenna combinations, and determine a second antenna combination based on the re-obtained key factors and radio frequency indicators that are of the m+n antenna combinations.

Optionally, in a specific implementation of this embodiment, the processing unit 802 is further configured to: when the terminal is in the Wi-Fi connected state and a portrait state, use the m primary antennas to perform communication for the first application program.

In addition, the antenna selection apparatus provided in this embodiment of this application includes m primary antennas and n secondary antennas, where m≥1, n≥1, and both m and n are positive integers. Further, the m primary antennas are configured to perform communication and transmission when the apparatus is in the portrait state. The n secondary antennas are configured to be combined with the m primary antennas to perform communication and transmission when the apparatus is in the landscape state and the Wi-Fi connected state. In the portrait state, the terminal may perform a service such as calling. In the landscape state and the Wi-Fi connected state, the terminal may perform a service such as a game or a video process.

Optionally, one of the n secondary antennas is disposed in a position of a center, an upper bezel, or a lower bezel of the terminal that is in the landscape state.

Further, that one secondary antenna is disposed in a position of a center of the terminal that is in a landscape state includes: The one secondary antenna is disposed in the position of the center of the terminal that is in the landscape state, or the one secondary antenna is disposed within a range covered by a circle centered at the center and with a radius not exceeding 30of a preset width, where the preset width is a width from the center position to the upper bezel or the lower bezel of the terminal that is in the landscape state.

Optionally, the n secondary antennas include at least one of the following: a monopole antenna, an inverted F antenna IFA, a planar inverted F antenna PIFA, a patch antenna, a loop antenna, and a slot antenna.

Optionally, the antenna selection apparatus is a terminal or a terminal device.

Figure 9:
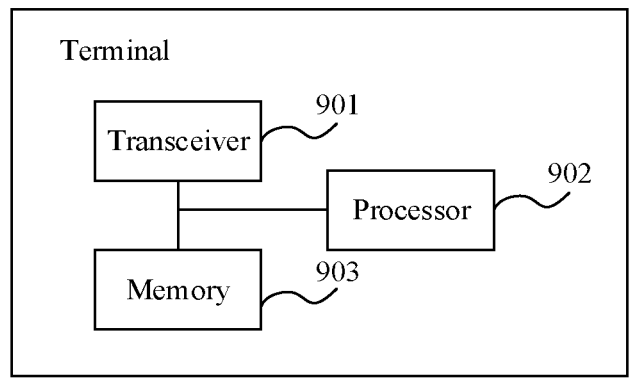
FIG. 9 is a schematic structural diagram of a terminal according to an embodiment of this application.

In specific hardware implementation, as shown in FIG. 9, this application further provides a terminal. Specifically, the terminal includes a transceiver 901, a processor 902, and a memory 903. The terminal may further include more or fewer components, or some components are combined, or the components are disposed differently. This is not limited in this application.

The transceiver 901 is configured to receive and send information or data, and perform data transmission with another device in a network. Further, the transceiver 901 may include a transceiver module. The transceiver module may include a communications module such as a wireless local area network (wireless local area network, WLAN) module, a Bluetooth module, or a baseband (base band) module, and a radio frequency (radio frequency, RF) circuit corresponding to the communications module, and is configured to perform wireless local area network communication, Bluetooth communication, infrared communication, and/or cellular communications system communication, for example, wideband code division multiple access (wideband code division multiple access, WCDMA) and/or high speed downlink packet access (high speed downlink packet access, HSDPA). The transceiver module is configured to control communication of components in a network device, and can support direct memory access (direct memory access).

The processor 902 is a control center of the terminal, is connected to each part of the entire terminal by using various interfaces and lines, and performs various functions of the terminal and/or data processing by running or executing a software program and/or a unit that are/is stored in the memory 903 and by invoking data stored in the memory 903.

Further, the processor 902 may include an integrated circuit (Integrated Circuit, IC). For example, the processor 902 may include a single encapsulated IC, or may include a plurality of encapsulated ICs that have same or different functions. For example, the processor may include only a central processing unit (Central Processing Unit, CPU), or may be a combination of a GPU, a digital signal processor (Digital Signal Processor, DSP), a picture processor, and a control chip (for example, a baseband chip) in the transceiver.

The memory 903 may include a volatile memory (volatile memory), for example, a random access memory (Random Access Memory, RAM), and may further include a non-volatile memory (non-volatile memory), for example, a flash memory (flash memory), a hard disk drive (Hard Disk Drive, HDD), or a solid-state drive (Solid-State Drive, SSD). The memory may further include a combination of memories of the foregoing categories. The memory may store a program or code, and the processor may implement a function of the network device by executing the program or code.

In this embodiment, a function of the obtaining unit 801 shown in FIG. 8 in the foregoing apparatus embodiment may be implemented by the transceiver 901, and a function to be implemented by the processing unit 802 shown in FIG. 8 in the foregoing apparatus embodiment may be implemented by the processor 902, or may be implemented by the transceiver 901 that is controlled by the processor 902. In addition, functions of the message module 100, the state machine module 200, and the algorithm module 300 shown in FIG. 5 or FIG. 6 in the foregoing method embodiment may all be implemented by the transceiver 901 and the processor 902.

Further, the terminal further includes m primary antennas and n secondary antennas, where m≥1, and n≥1. One of the at least one secondary antenna is disposed in a position of a center, an upper bezel, or a lower bezel of the terminal that is in a landscape state. In addition, the secondary antenna may be alternatively disposed in another position not easily blocked by a hand when a user holds the terminal in a landscape mode.

Optionally, that one secondary antenna is disposed in a position of a center of the terminal that is in a landscape state includes: being disposed in the position of the center of the terminal that is in the landscape state, or within a range covered by a circle centered at the center and with a radius not exceeding 30% of a preset width, where the preset width is a width from the center position to the upper bezel or the lower bezel of the terminal that is in the landscape state.

Optionally, the n secondary antennas include at least one of the following: a monopole antenna, an inverted F antenna IFA, a planar inverted F antenna PIFA, a patch antenna, a loop antenna, a slot antenna, and the like.

Optionally, the processor 902 is further configured to execute an instruction in the memory and perform the following steps: calculating a key factor score of each antenna combination based on the key factor; determining a radio frequency reference score of each antenna combination based on the radio frequency indicator; calculating a total score of each antenna combination, where the total score is a sum of the radio frequency reference score and the key factor score; and selecting an antenna combination with a highest total score as the first antenna combination.

Further, the radio frequency reference score is determined based on the radio frequency indicator. The radio frequency indicator includes at least one of the following: antenna receiver sensitivity, a transmit power, error vector magnitude, a radiation pattern, and an extreme Wi-Fi throughput.

In addition, optionally, the processor 902 is further configured to execute the instruction in the memory and perform the following steps: after using the first antenna combination to perform communication for a second application program, obtaining a key factor and a radio frequency indicator that are measured when the first antenna combination is used; and when a total score calculated based on the key factor and the radio frequency indicator that are measured when the first antenna combination is used is less than a first threshold, re-obtaining key factors and radio frequency indicators that are of the m+n antenna combinations, and determining a second antenna combination based on the re-obtained key factors and radio frequency indicators that are of the m+n antenna combinations.

Optionally, the processor 902 is further configured to execute the instruction in the memory and perform the following step: when the terminal is in a Wi-Fi connected state and a portrait state, using the m primary antennas to perform communication for the first application program.

Figure 10:
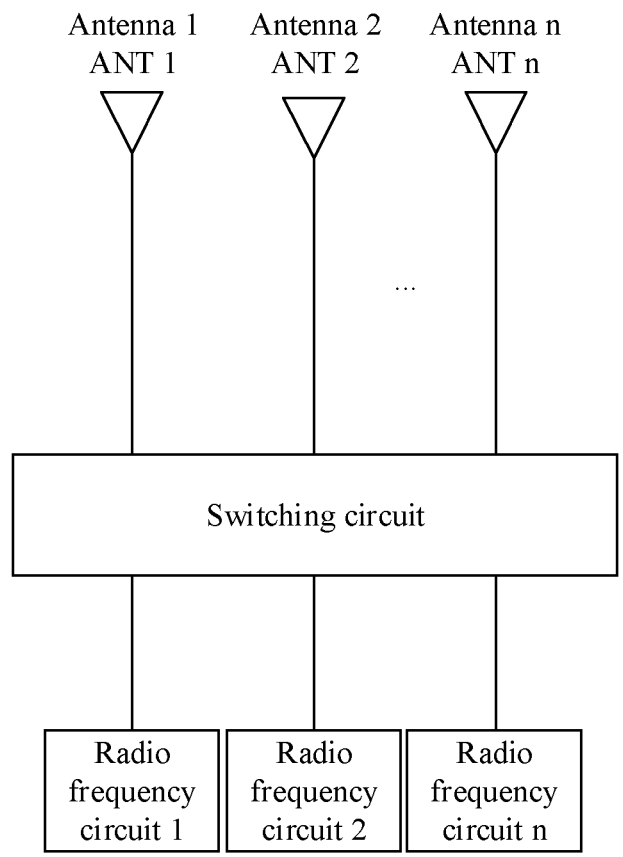
FIG. 10 is a schematic structural diagram of a switching circuit according to an embodiment of this application.

At a specific implementation layer, as shown in FIG. 10, the processor 902 further includes a switching circuit, configured to switch between different antenna combinations, for example, an ANT 1, and ANT 2, and an ANT 3. Each antenna is connected to a radio frequency circuit through the switching circuit. For example, the ANT 1 is connected to a radio frequency circuit (RF circuit) 1 through the switching circuit, the ANT 2 is connected to a radio frequency circuit 2 through the switching circuit, and the ANT 3 is connected to a radio frequency circuit 3 through the switching circuit. Certainly, more antennas and more radio frequency circuits, for example, an ANT n and an RF circuit n, may be further included. This is not limited in this embodiment.

It should be noted that a radio frequency circuit or a radio frequency system of each antenna may be implemented by the switching circuit. The switching circuit includes but is not limited to a switch. In this embodiment, measurement and reporting of various antenna combinations between a plurality of systems or within a single system may be implemented by using the switching circuit.

In addition, the at least one secondary antenna may form an antenna of another frequency band through shape changing, size changing, matching, or the like. A frequency multiple of the secondary antenna may be used for another communication frequency band, another operating frequency, and another wavelength range. This is not limited in this embodiment.

Figure 11:
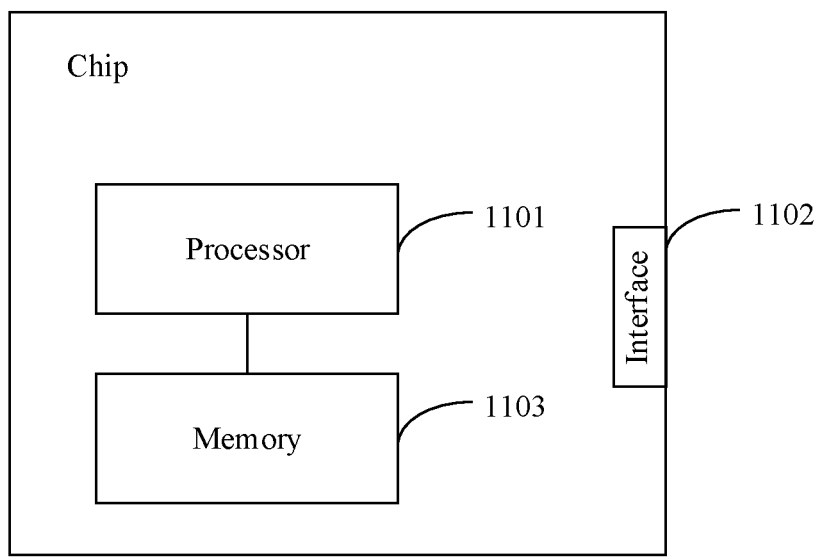
FIG. 11 is a schematic structural diagram of a chip according to an embodiment of this application.

In addition, an embodiment of this application further provides a chip or a chip system. As shown in FIG. 11, the chip includes a processor 1101 and an interface 1102, where the interface 1102 is coupled to the processor 1101. In addition, the chip further includes a memory 1103 or another functional unit or module.

The memory 1103 is configured to store a computer program or an instruction.

The processor 1101 is configured to execute the computer program or the instruction in the memory 1103 and implement the following method steps: when a terminal is in a Wi-Fi connected state and a landscape state, obtaining a key factor and a radio frequency indicator that are of each of m+n antenna combinations; determining a first antenna combination based on the key factor and the radio frequency indicator, where the first antenna combination is a first-priority antenna combination of the m+n antenna combinations, and the first antenna combination includes at least one of the secondary antennas; and using the first antenna combination to perform communication for a second application program.

The interface 1102 is configured to communicate with another module other than the chip.

m represents a quantity of primary antennas configured for a first application program, and m≥1. n represents a quantity of the secondary antennas configured for the second application program. The key factor includes one or more of an application delay, a received signal strength indicator RSSI, a signal-to-noise ratio SNR, and a packet loss rate. The radio frequency indicator includes one or more of antenna receiver sensitivity, a transmit power, error vector magnitude, a radiation pattern, and an extreme Wi-Fi throughput.

Optionally, in a possible implementation, the processor 1101 is further configured to execute the computer program or the instruction and implement the following steps: calculating a key factor score of each antenna combination based on the key factor; determining a radio frequency reference score of each antenna combination based on the radio frequency indicator; calculating a total score of each antenna combination, where the total score is a sum of the radio frequency reference score and the key factor score; and selecting an antenna combination with a highest total score as the first antenna combination.

Optionally, in a possible implementation, the processor 1101 is further configured to execute the computer program or the instruction and implement the following steps: after using the first antenna combination to perform communication for the second application program, obtaining a key factor and a radio frequency indicator that are measured when the first antenna combination is used; and when a total score calculated based on the key factor and the radio frequency indicator that are measured when the first antenna combination is used is less than a first threshold, re-obtaining key factors and radio frequency indicators that are of the m+n antenna combinations, and determining a second antenna combination based on the re-obtained key factors and radio frequency indicators that are of the m+n antenna combinations.

Optionally, the processor 1101 is further configured to execute the computer program or the instruction and implement the following step: when the terminal is in the Wi-Fi connected state and a portrait state, using the m primary antennas to perform communication for the first application program.

Optionally, the chip may be disposed in the terminal. Further, the terminal includes the m primary antennas configured for the first application program and the n secondary antennas configured for the second application program, where m≥1, and n≥1.

Optionally, one of the at least one secondary antenna is disposed in a position of a center, an upper bezel, or a lower bezel of the terminal that is in the landscape state.

Optionally, further, that one secondary antenna is disposed in a position of a center of the terminal that is in the landscape state includes: The one secondary antenna is disposed in the position of the center of the terminal that is in the landscape state, or the one secondary antenna is disposed within a range covered by a circle centered at the center and with a radius not exceeding 30% of a preset width, where the preset width is a width from the center position to the upper bezel or the lower bezel of the terminal that is in the landscape state.

The n secondary antennas include at least one of the following: a monopole antenna, an inverted F antenna IFA, a planar inverted F antenna PIFA, a patch antenna, a loop antenna, and a slot antenna.

In addition, this application further provides a computer storage medium, where the computer storage medium may store a program, and when the program is executed, some or all of the steps of the embodiments of the antenna selection method provided in this application may be performed. The foregoing storage medium may include: a magnetic disk, a compact disc, a read-only memory, or a random access memory.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer programs are loaded and executed on the computer, the procedure or functions according to the foregoing embodiments of this application are all or partially generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a network node, computer, server, or data center to another station, computer, or server in a wired or wireless manner.

For same or similar parts in the embodiments in this specification, refer to these embodiments. Especially, the apparatus embodiment is basically similar to a method embodiment, and therefore is described briefly; and for related parts, refer to descriptions in the method embodiment.

In addition, in the descriptions of this application, "a plurality of" means two or more than two. In addition, to clearly describe the technical solutions in the embodiments of this application, words such as "first" and "second" are used in the embodiments of this application to distinguish between same or similar items that have basically same functions and roles. A person skilled in the art may understand that the words such as "first" and "second" do not limit a quantity and an execution order, and the words such as "first" and "second" do not limit a definite difference either.

The foregoing descriptions are implementations of this application, but are not intended to limit the protection scope of this application.

What is claimed is:

1. A method implemented by a terminal, wherein the terminal comprises m primary antennas configured for a first application program and n secondary antennas, and wherein the method comprises:
    obtaining a first key factor and a first radio frequency indicator that are of each of m+n antenna combinations when the terminal is in a WI-FI connected state and a landscape state, where m and n are integers, wherein the first key factor comprises one or more of an application delay, a received signal strength indicator (RSSI), a signal-to-noise ratio (SNR), or a packet loss rate, and wherein the first radio frequency indicator comprises one or more of an antenna receiver sensitivity, a transmit power, an error vector magnitude, a radiation pattern, or an extreme WI-FI throughput;
    determining a first antenna combination based on the first key factor and the first radio frequency indicator, wherein the first antenna combination is a first-priority antenna combination in the m+n antenna combinations, and wherein the first antenna combination comprises one secondary antenna of the n secondary antennas; and
    setting the first antenna combination to perform communication for a second application program.

2. The method according toof claim 1, further comprising:
    calculating a key factor score of each of the m+n antenna combinations based on the first key factor;
    determining a radio frequency reference score of each of the m+n antenna combinations based on the first radio frequency indicator;
    calculating a total score of each of the m+n antenna combinations, wherein the total score is a sum of the radio frequency reference score and the key factor score; and
    selecting an antenna combination with a highest total score as the first antenna combination.

3. The method of claim 2, wherein after setting the first antenna combination, the method further comprises:
    obtaining a second key factor and a second radio frequency indicator when the first antenna combination is used;
    calculating a second total score based on the second key factor and the second radio frequency indicator;
    determining whether the second total score is less than a first threshold;
    obtaining, in response to determining the second total score is less than the first threshold, third key factors and third radio frequency indicators of the m+n antenna combinations; and
    determining a second antenna combination based on the third key factors and the third radio frequency indicators.

4. The method of claim 1, further comprising:
    determining whether the terminal is in the WI-FI connected state and a portrait state; and
    setting, in response to determining the terminal is in the WI-FI connected state and the portrait state, using the m primary antennas to perform communication for the first application program.

5. The method of claim 1, further comprising identifying that the one secondary antenna is disposed in a position of a center, an upper bezel, or a lower bezel of the terminal that is in the landscape state.

6. The method of claim 5, further comprising identifying either the one secondary antenna is disposed in the position of the center or the or the one secondary antenna is disposed within a range covered by a circle centered at the center and with a radius not exceeding 30% of a preset width, wherein the preset width is from the center to the upper bezel or the lower bezel.

7. The method of claim 1, wherein the n secondary antennas comprise at least one of a monopole antenna, an inverted F antenna (IFA), a planar inverted F antenna (PIFA), a patch antenna, a loop antenna, or a slot antenna.

8. A terminal comprising:
m primary antennas configured to perform communication for a first application program, wherein m is an integer;
n secondary antennas, wherein n is an integer; and
a processor coupled to the m primary antennas and the n secondary antennas and configured to:
obtain a first key factor and a first radio frequency indicator that are of each of m+n antenna combinations when the terminal is in a WI-FI connected state and a landscape state, wherein the first key factor comprises one or more of an application delay, a received signal strength indicator (RSSI), a signal-to-noise ratio (SNR), or a packet loss rate, and wherein the first radio frequency indicator comprises one or more of antenna receiver sensitivity, a transmit power, error vector magnitude, a radiation pattern, or an extreme WI-FI throughput;
determine a first antenna combination based on the first key factor and the first radio frequency indicator, wherein the first antenna combination is a first-priority antenna combination of the m+n antenna combinations, and wherein the first antenna combination comprises at least one secondary antenna of the n secondary antennas; and
set the first antenna combination to perform communication for a second application program.

9. The terminal of claim 8, wherein the processor is further configured to:
calculate a key factor score of each of the m+n antenna combinations based on the first key factor;
determine a radio frequency reference score of each of the m+n antenna combinations based on the first radio frequency indicator;
calculate a total score of each of the m+n antenna combinations, wherein the total score is a sum of the radio frequency reference score and the key factor score; and
select an antenna combination with a highest total score as the first antenna combination.

10. The terminal of claim 8, wherein after setting the first antenna combination, the processor is further configured to execute:
obtain a second key factor and a second radio frequency indicator that are measured when the first antenna combination is used;
calculate a second total score calculated based on the second key factor and the second radio frequency indicator;
determine whether the second total score is less than a first threshold;
obtain, in response to determining the second total score is less than the first threshold, third key factors and third radio frequency indicators of the m+n antenna combinations; and
determine a second antenna combination based on the third key factors and the third radio frequency indicators.

11. The terminal of claim 8, wherein the processor is further configured to:
determine whether the terminal is in the WI-FI connected state and a portrait state; and
set, in response to determining the terminal is in the WI-FI connected state and the portrait state, the m primary antennas to perform communication for the first application program.

12. The terminal of claim 8, wherein the processor is further configured to identify that the one secondary antenna is disposed in a position of a center, an upper bezel, or a lower bezel of the terminal that is in the landscape state.

13. The terminal according toof claim 12, wherein the processor is further configured to identify that either the one secondary antenna is disposed in the position of the center, or the one secondary antenna is disposed within a range covered by a circle centered at the center and with a radius not exceeding 30% of a preset width, and wherein the preset width is from the center to the upper bezel or the lower bezel.

14. The terminal of claim 8, wherein the n secondary antennas comprise at least one of a monopole antenna, an inverted F antenna IFA, a planar inverted F antenna PIFA, a patch antenna, a loop antenna, and a slot antenna.

15. A computer program product comprising computer-executable instructions stored on a non-transitory computer-readable medium that, when executed by a processor, cause a terminal to:
obtain a first key factor and a first radio frequency indicator that are of each of m+n antenna combinations when the terminal is in a WI-FI connected state and a landscape state, wherein m represents a quantity of primary antennas configured for a first application program of the terminal, wherein n represents a quantity of the secondary antennas, wherein m and n are integers, wherein the key factor comprises one or more of an application delay, a received signal strength indicator (RSSI), a signal-to-noise ratio (SNR), or a packet loss rate, and wherein the second radio frequency indicator comprises one or more of antenna receiver sensitivity, a transmit power, error vector magnitude, a radiation pattern, or an extreme WI-FI throughput;
determine a first antenna combination based on the first key factor and the first radio frequency indicator, wherein the first antenna combination is a first-priority antenna combination of the m+n antenna combinations, and wherein the first antenna combination comprises one secondary antenna of the n secondary antennas; and
set the first antenna combination to perform communication for a second application program.

16. The computer program product of claim 15, wherein the computer-executable instructions further cause the terminal to:
calculate a key factor score of each of the m+n antenna combinations based on the first key factor;
determine a radio frequency reference score of each of the m+n antenna combinations based on the first radio frequency indicator;
calculate a total score of each of the m+n antenna combinations, wherein the total score is a sum of the radio frequency reference score and the key factor score; and
select an antenna combination with a highest total score as the first antenna combination.

17. The computer program product of claim 15, wherein after setting the first antenna combination, the computer-executable instructions further cause the terminal to:

obtain a second key factor and a second radio frequency indicator that are measured when the first antenna combination is used;

calculate a second total score based on the second key factor and the second radio frequency indicator;

determine whether the second total score is less than a first threshold;

obtain, in response to determining the second total score is less than the first threshold, third key factors and third radio frequency indicators that are of the m+n antenna combinations; and determine a second antenna combination based on the third key factors and the third radio frequency indicators.

18. The tocomputer program product of claim 15, wherein the computer-executable instructions further cause the terminal to:

determine whether the terminal is in the WI-FI connected state and a portrait state; and set, in response to determining the terminal is in the WI-FI connected state and the portrait state, the m primary antennas to perform communication for the first application program.

19. The computer program product of claim 15, wherein the n secondary antennas comprise at least one of monopole antenna, an inverted F antenna IFA, a planar inverted F antenna PIFA, a patch antenna, a loop antenna, and a slot antenna.

20. The computer program product of claim 15, wherein the computer-executable instructions further cause the terminal to identify that the one secondary antenna is disposed in a position of a center, an upper bezel, or a lower bezel of the terminal that is in the landscape state.

* * * * *